(12) United States Patent
Beger et al.

(10) Patent No.: US 10,161,115 B2
(45) Date of Patent: Dec. 25, 2018

(54) WATER DETECTION AND SHUT-OFF SYSTEM AND METHODS

(71) Applicant: ELEXA CONSUMER PRODUCTS, INC., Bannockburn, IL (US)

(72) Inventors: Lawrence J. Beger, Lake Forest, IL (US); Mateusz Cwiokowski, Palatine, IL (US); Chun Kuen Sze, Shenzhen (CN)

(73) Assignee: ELEXA CONSUMER PRODUCTS, INC., Bannockburn, IL (US)

( * ) Notice: Subject to any disclaimer, the term of this patent is extended or adjusted under 35 U.S.C. 154(b) by 114 days.

(21) Appl. No.: 15/334,934

(22) Filed: Oct. 26, 2016

(65) Prior Publication Data

US 2018/0112376 A1    Apr. 26, 2018

(51) Int. Cl.
| | |
|---|---|
| F16K 31/02 | (2006.01) |
| E03B 7/07 | (2006.01) |
| F16K 17/36 | (2006.01) |
| F17D 5/02 | (2006.01) |
| F16K 31/05 | (2006.01) |

(52) U.S. Cl.
CPC .............. *E03B 7/071* (2013.01); *F16K 17/36* (2013.01); *F16K 31/055* (2013.01); *F17D 5/02* (2013.01)

(58) Field of Classification Search
CPC .................................. E03B 7/071; F16K 17/36
USPC ............................................. 137/487.5, 551
See application file for complete search history.

(56) References Cited

U.S. PATENT DOCUMENTS

| | | | | |
|---|---|---|---|---|
| 4,705,063 A | * | 11/1987 | Robinson ................... | F16K 5/08 137/315.03 |
| 5,058,421 A | * | 10/1991 | Alexander ............ | G01F 23/241 340/620 |
| 5,334,973 A | * | 8/1994 | Furr ........................ | G01M 3/16 200/61.05 |
| 5,546,009 A | * | 8/1996 | Raphael ................ | G01F 23/242 324/556 |
| 5,634,486 A | * | 6/1997 | Hatting ................. | F16K 5/0442 137/315.01 |
| 5,967,171 A | * | 10/1999 | Dwyer, Jr. ............ | D06F 39/081 137/312 |
| 6,025,788 A | * | 2/2000 | Diduck ................... | G01M 3/18 340/3.4 |

(Continued)

FOREIGN PATENT DOCUMENTS

| | | |
|---|---|---|
| CN | 1648503 | 8/2005 |
| CN | 201202136 | 3/2009 |

(Continued)

OTHER PUBLICATIONS

Search Report and Written Opinion issued in Int'l App. No. PCT/CN2016/103377 (dated 2017).

*Primary Examiner* — Minh Le
(74) *Attorney, Agent, or Firm* — Barnes & Thornburg LLP

(57) ABSTRACT

A water detection and shut-off system is disclosed. The water detection system may be battery powered and include a water detector, a satellite water detector, and a water shut-off mechanism. The detectors and shut-off mechanism may be communicatively coupled via one or more communication links to a client component such as a smartphone app. Upon detecting the presence of unwanted water, the shut-off mechanism may operate an electric motor to close a water shut-off valve to prevent flooding or water damage.

9 Claims, 8 Drawing Sheets

(56) References Cited

U.S. PATENT DOCUMENTS

Figure 2:
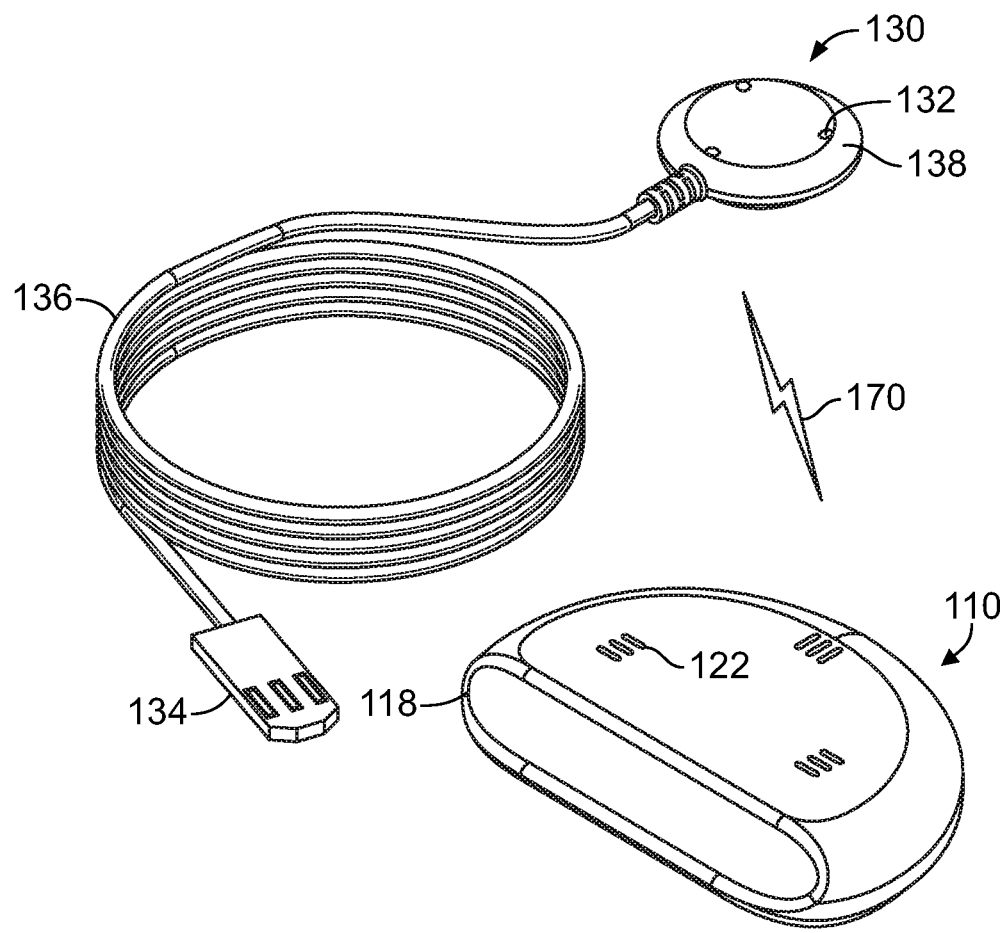

| | | | | |
|---|---|---|---|---|
| 6,065,735 A * | 5/2000 | Clark | ............... | F01L 13/0005 251/129.03 |
| 6,186,162 B1 * | 2/2001 | Purvis | ............... | D06F 39/081 122/504.2 |
| 6,414,598 B2 * | 7/2002 | Freill | ............... | G01F 23/36 340/623 |
| 6,489,895 B1 * | 12/2002 | Apelman | ............... | G01M 3/18 137/312 |
| 6,530,557 B1 * | 3/2003 | Guzorek | ............... | F16K 31/055 251/129.12 |
| 6,662,821 B2 * | 12/2003 | Jacobsen | ............... | F16K 31/05 137/2 |
| 6,880,806 B2 * | 4/2005 | Haikawa | ............... | F16K 31/041 137/385 |
| 6,950,032 B1 * | 9/2005 | Hewitt | ............... | D06F 39/081 137/312 |
| D511,703 S * | 11/2005 | Moyer | ............... | D10/101 |
| 7,066,192 B1 * | 6/2006 | Delaney | ............... | F16K 31/055 137/15.18 |
| 7,195,038 B2 * | 3/2007 | Friedline | ............... | F16L 3/085 138/106 |
| 7,218,237 B2 * | 5/2007 | Kates | ............... | G08B 19/00 137/312 |
| 7,671,754 B2 * | 3/2010 | Heilmann | ............... | G01M 3/186 200/61.04 |
| 7,753,071 B2 * | 7/2010 | Wood | ............... | G01M 3/16 137/312 |
| 7,948,388 B2 * | 5/2011 | McGinty | ............... | G08B 21/20 137/15.11 |
| 8,256,742 B2 * | 9/2012 | Staffiere | ............... | F16K 31/055 251/129.11 |
| 8,590,559 B1 * | 11/2013 | Gutierrez | ............... | E03B 7/071 137/312 |
| 8,789,807 B2 * | 7/2014 | Kreuter | ............... | F16K 31/041 251/291 |
| 9,016,662 B2 * | 4/2015 | Staffiere | ............... | F16K 31/055 251/129.11 |
| 9,671,031 B2 * | 6/2017 | Ben Old | ............... | F16K 31/042 |
| 9,759,345 B2 * | 9/2017 | Savla | ............... | G01M 3/16 |
| 2005/0236594 A1 * | 10/2005 | Lilly | ............... | F16K 31/02 251/129.03 |
| 2006/0124171 A1 * | 6/2006 | Ghazarian | ............... | F17D 5/06 137/312 |
| 2008/0055112 A1 * | 3/2008 | McGinty | ............... | A47L 15/4212 340/870.16 |
| 2011/0048555 A1 * | 3/2011 | Malouf | ............... | G01M 3/16 137/551 |
| 2011/0180161 A1 | 7/2011 | Boren | | |
| 2013/0248023 A1 * | 9/2013 | Estrada, Jr. | ............... | E03B 7/071 137/551 |
| 2014/0264111 A1 * | 9/2014 | Porter | ............... | F16K 17/36 251/129.03 |
| 2017/0357275 A1 * | 12/2017 | Smith | ............... | G05D 7/0635 |

FOREIGN PATENT DOCUMENTS

| | | |
|---|---|---|
| CN | 202493765 U | 10/2012 |
| CN | 103195965 | 7/2013 |
| CN | 204029141 U | 12/2014 |
| CN | 205980007 U | 2/2017 |

* cited by examiner

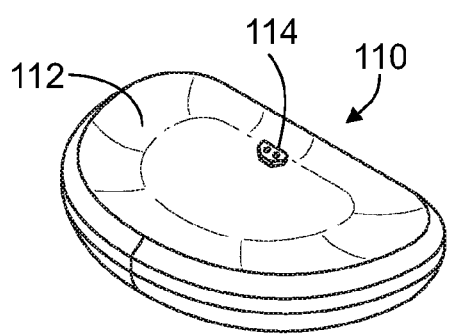
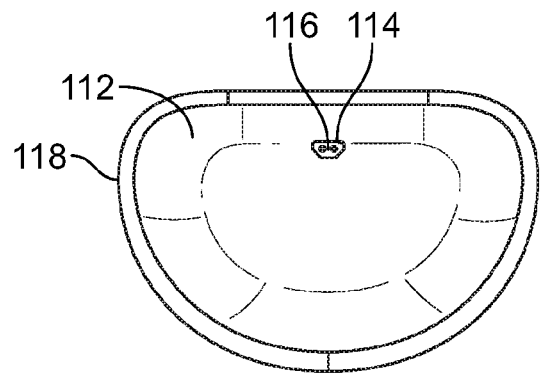
FIG. 1A  FIG. 1B
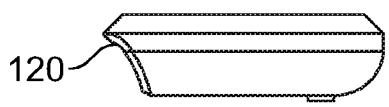
FIG. 1E  FIG. 1D
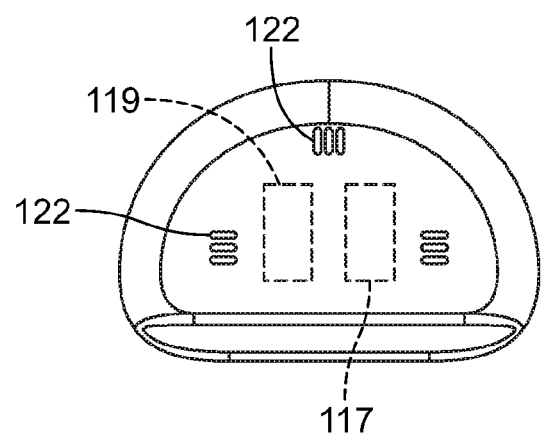
FIG. 1C

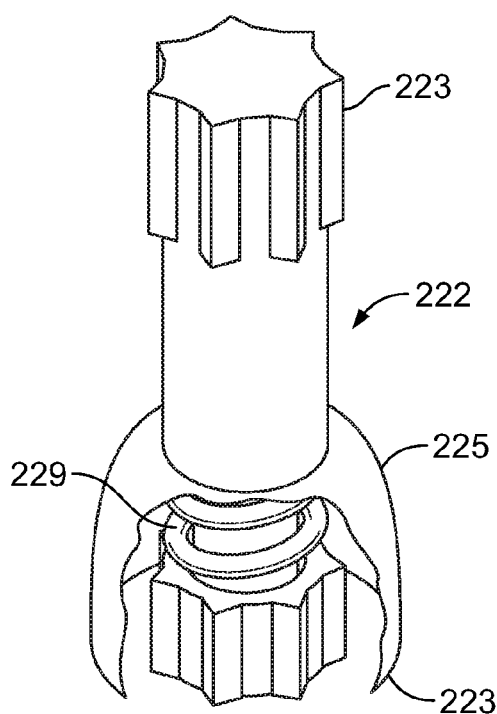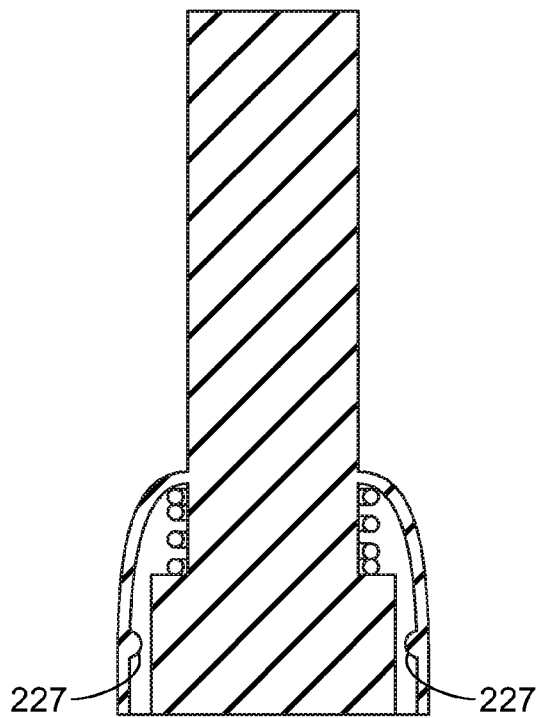
FIG. 6A  FIG. 6B
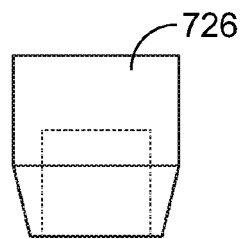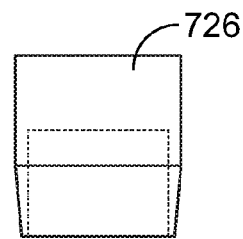
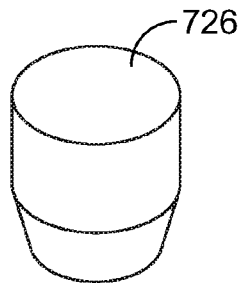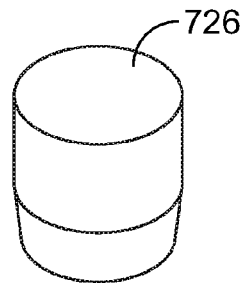
FIG. 7

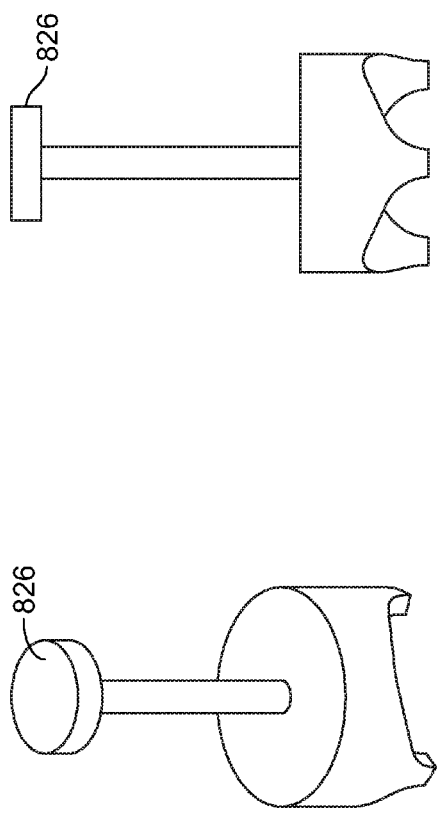
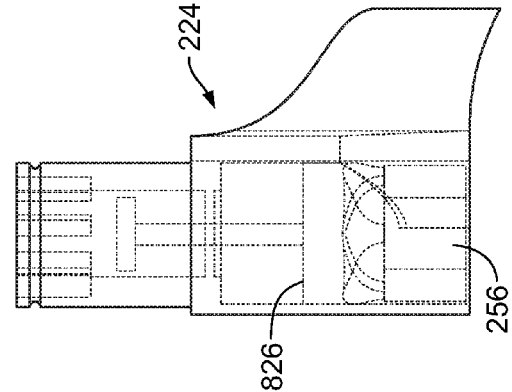
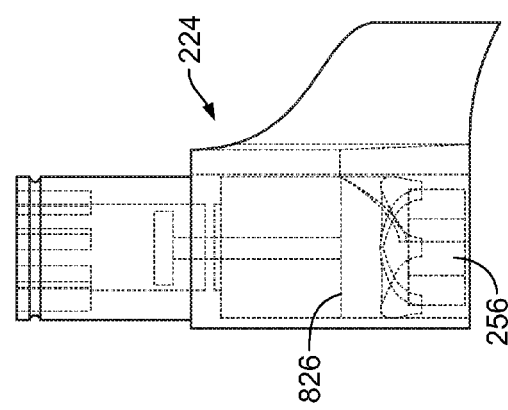

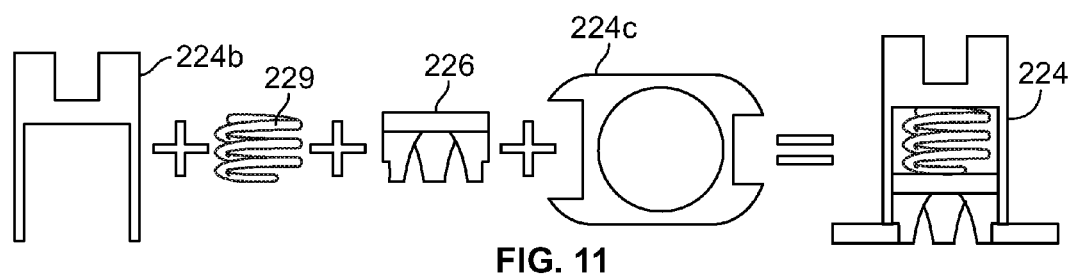
FIG. 11
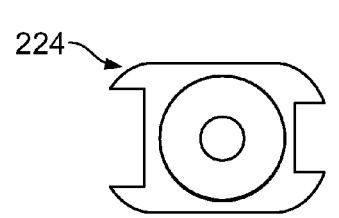 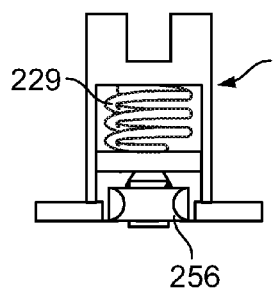 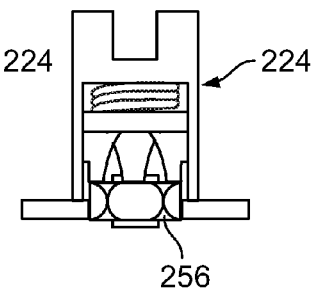
FIG. 12A   FIG. 12B   FIG. 12C

WATER DETECTION AND SHUT-OFF SYSTEM AND METHODS

CROSS REFERENCE TO RELATED APPLICATIONS

This application claims priority to International Patent Application No. PCT/CN2016/103377, filed Oct. 26, 2016. The disclosure set forth in the referenced application is incorporated herein by reference in its entirety.

BACKGROUND

The present disclosure relates to a water detection and shut-off system and methods. More particularly, the present disclosure relates to a water detector and water shut-off mechanism that are communicatively coupled and work together to detect the presence of water and automatically shut-off a water valve to prevent flooding or water damage.

SUMMARY

According to the present disclosure, a water detection system includes a water detector with one or more water sensors adapted to detect the presence of water and a water shut-off mechanism that retrofits to an existing water pipe and shut-off valve.

In illustrative embodiments, the water detection system includes a water detector with a catch basin with an aperture located at a lower portion of the catch basin. The water sensor is located within the aperture and adapted to detect the presence of water. The water detector also includes a wireless transmitter; and a battery operatively coupled to the water sensor and the wireless transmitter. The water detection system includes a water shut-off mechanism adapted to couple a water pipe with a shut-off valve. The water shut-off mechanism includes a chassis adapted to couple to the water pipe via pipe sleeves and pipe clamps. The water shut-off mechanism includes a motor coupled to the chassis, a battery electrically connected to the motor, a sprocket coupled to the motor, and a transmission coupled to the sprocket with two protrusions adapted to fit around a handle of the shut-off valve. The water shut-off mechanism includes a wireless receiver communicatively coupled to the water detector. When the water sensor detects the presence of water, the water detector sends, via the wireless transmitter, an alert. In response to receiving the alert, the water shut-off mechanism turns the shut-off valve to a closed position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 3:
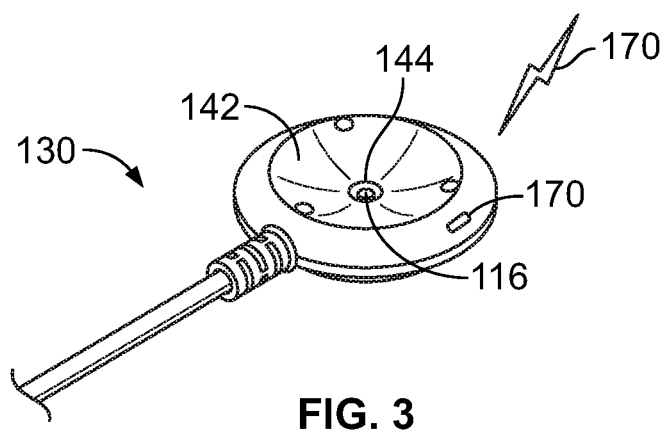
Figure 4:
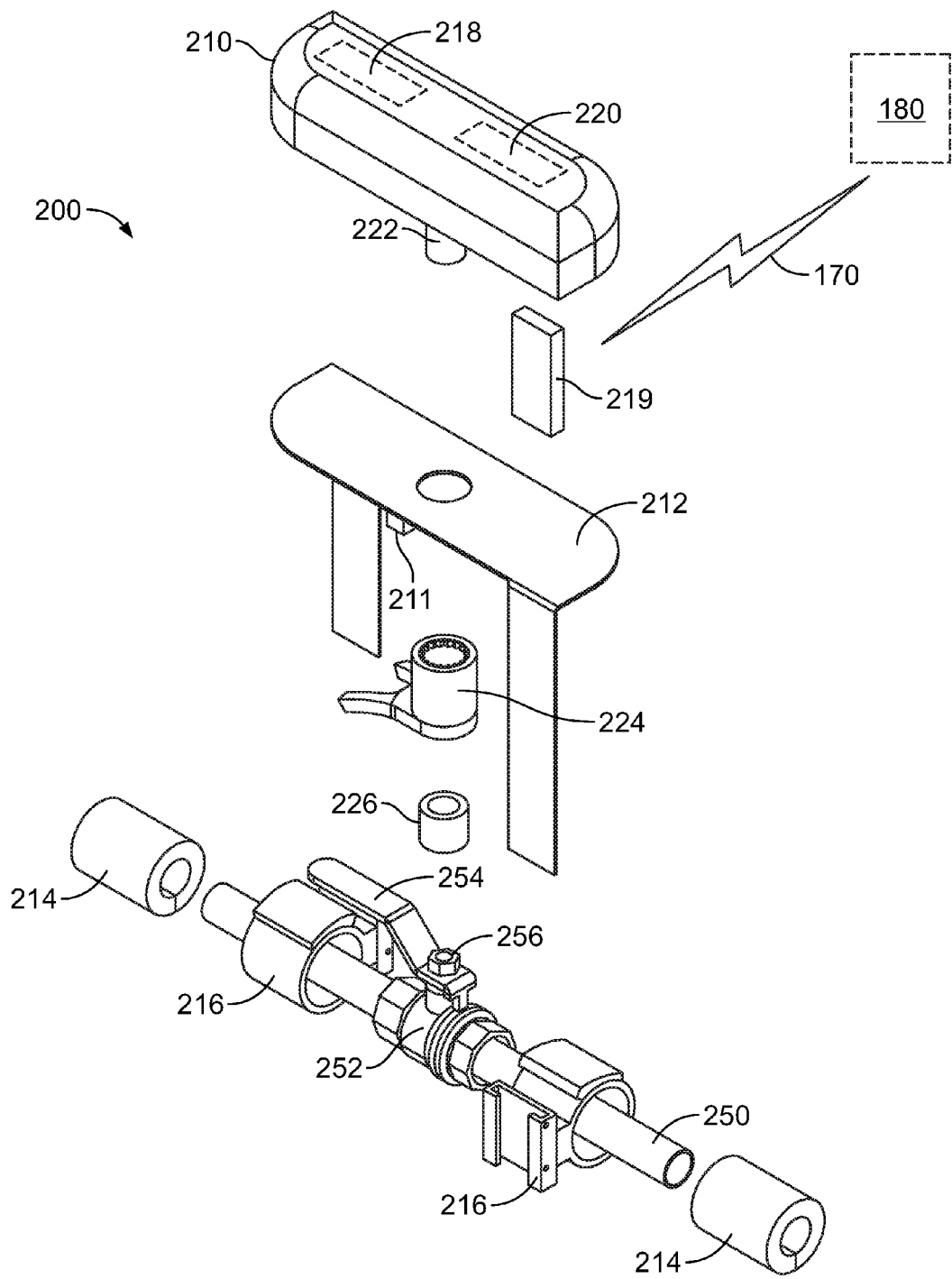
Figure 5A:
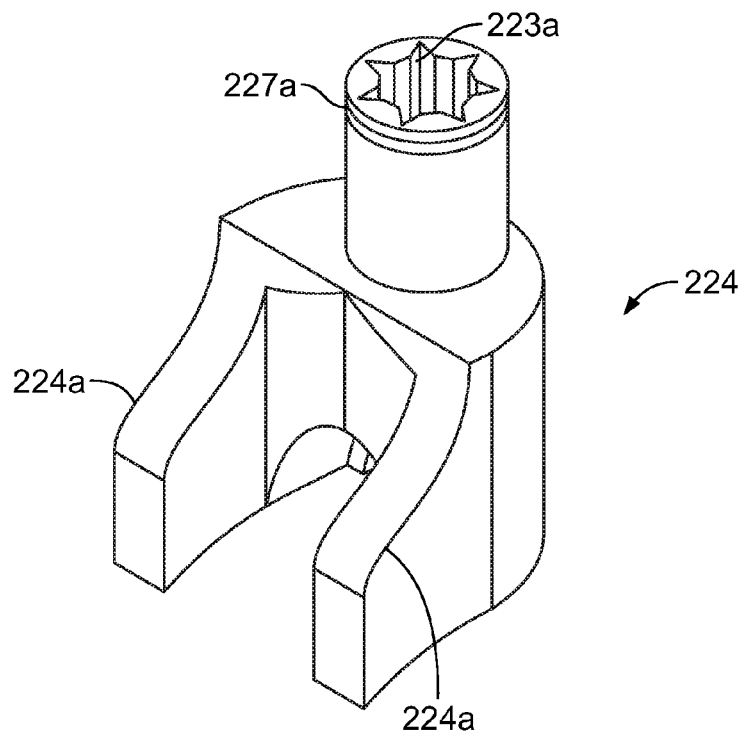
Figure 5B:
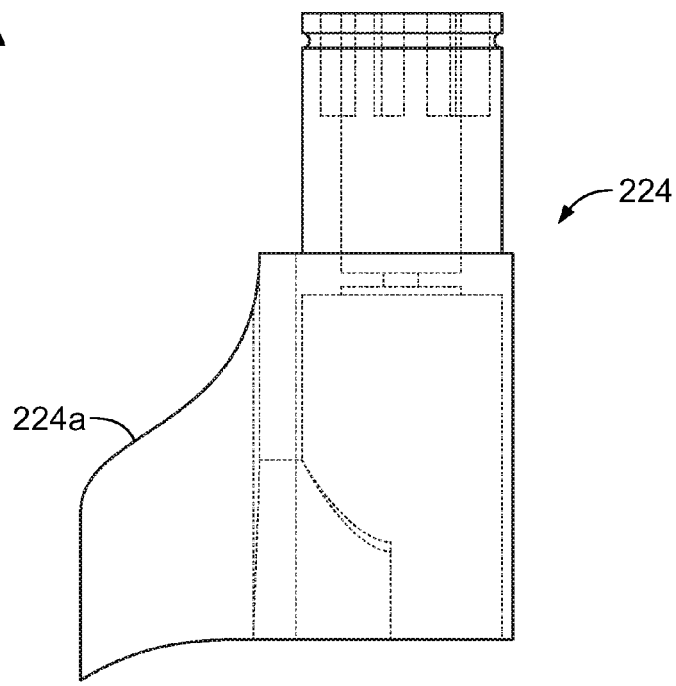
Figure 10:
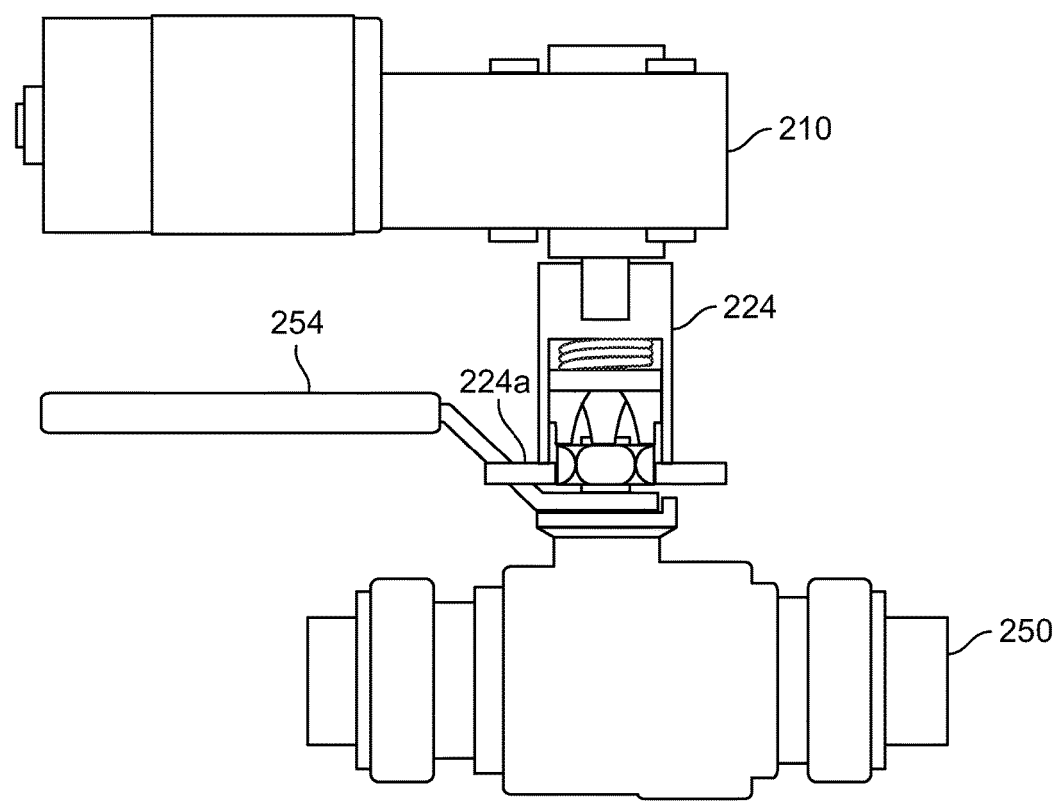

The detailed description particularly refers to the accompanying figures in which:

FIGS. 1A, 1B, 1C, 1D, and 1E are views of a water detector;

FIG. 1A shows a top perspective view of a water detector;
FIG. 1B shows a top view of a water detector;
FIG. 1C shows a bottom view of a water detector;
FIG. 1D shows a front view of a water detector;
FIG. 1E shows a side view of a water detector;
FIG. 2 shows a bottom perspective view of the water detector of FIGS. 1A-1E and a bottom perspective view of a satellite water detector;

FIG. 3 shows a top perspective view of the satellite water detector of FIG. 2;
FIG. 4 shows a perspective and exploded view of a water shut-off mechanism;
FIG. 5A shows a perspective view of a transmission of the water shut-off mechanism of FIG. 4;
FIG. 5B shows a side view of the transmission of FIG. 5A;
FIG. 6A shows a perspective view of a sprocket of the water shut-off mechanism of FIG. 4 including a cut-out portion showing an example skirt interior;
FIG. 6B shows a cross-sectional view of the sprocket along line C-C from FIG. 6A;
FIG. 7 shows examples of the valve nut sleeve of FIG. 4;
FIG. 8A shows a perspective view of a self-centering chuck;
FIG. 8B shows a side view of the self-centering chuck of FIG. 8A;
FIGS. 9A, 9B, and 9C show the self-centering chuck of FIG. 8A with the transmission of FIG. 4 and illustrates how the chuck and transmission can accommodate various ball valve nut sizes.
FIG. 10 illustrates a water shut-off mechanism, according to some embodiments.
FIG. 11 illustrates an exploded view of the components of a transmission, according to some embodiments.
FIG. 12A shows a top view of the transmission of FIG. 11.
FIG. 12B shows a cross-sectional view of the transmission of FIG. 11 fitting to a smaller shut-off valve nut.
FIG. 12C shows a cross-sectional view of the transmission of FIG. 11 fitting to a larger shut-off valve nut.

DETAILED DESCRIPTION

A water (or other liquid) detection and shut-off system in accordance with the present disclosure may include a water detector 110, as shown and described in reference to FIGS. 1A-1E, a satellite water detector 130, as shown and described in reference to FIGS. 2 and 3, and/or a water shut-off mechanism 200 as shown and described in reference to FIGS. 4, 5A, 5B, 6A, 6B, 7, 8A, 8B, 9A, 9B, and 9C. The water detector 110, satellite water detector 130, and water shut-off mechanism 200 may be communicatively coupled via one or more communication links 170 to a client component 180 (e.g., a smartphone app, a website, a desktop program, or other interface).

The client component 180 may include the ability to control or monitor components of the water detection system. For example, the client component may be a smartphone app that allows the user to open or close the water shut-off valve, to control the volume of an audible alarm, to monitor the remaining battery life of the water detector 110, the satellite water detector 130, and/or the water shut-off mechanism 200, or to provide any other electronically controllable functionality.

Regardless of whether the client component 180 is functioning, the water detection system can still communicate with itself (and power itself via batteries) to turn off the water supply in the event unwanted water is detected. For example, if a house loses power, a WiFi-only water detection system might be disabled and unable to operate. In some embodiments according to the present disclosure, RF communication and battery power ensures operation of the water detection system even in the event of a power outage.

FIGS. 1A, 1B, 1C, 1D, and 1E are views of a water detector in accordance with the present disclosure. Water detector 110 includes a catch basin 112 with an aperture 114 located at a lower portion of the catch basin. The catch basin 112 is sloped downwards towards the aperture 114 to help collect even small amounts of unwanted water.

A water sensor 116 is located within the aperture 114. In some embodiments, the water sensor 116 may comprise two wires or contacts that are exposed but are not connected. When water is present between the two wires or contacts, the electrical conductivity of water decreases the resistance between the two contacts.

The water detector 110 may be encased by a housing 118. In some embodiments, the housing 118 may be waterproof (e.g., via an enclosure with an IP67 or comparable rating).

The housing 118 may include an external groove 120. As shown in FIG. 1E, the external groove 120 may correspond to the shape of quarter-round trim to allow the water detector 110 to sit flush against a residential home wall, even where that wall has trim installed.

As shown in FIG. 1C, the water detector 110 may include additional water sensors apertures 122. In some embodiments, one or more additional water sensors may be located within the apertures 122. In this way, the water detector 110 can detect the presence of water in two ways: (1) the water sensor 116 within the aperture 114 located at the lower portion of the catch basin 118 can detect water from drips (e.g., drips from sink traps, toilet water supplies, or kitchen water supplies) and (2) the one or more additional water sensors located within apertures 122 can detect rising water (e.g., a sump drain, a basement location, etc.). In some embodiments, apertures 122 may be used to attach stabilizers (e.g., rubber feet) or other devices to the bottom of the water detector 110.

The water detector 110 may include additional components 117. For example, the water detector 110 may include additional components 117 such as a speaker (e.g., for an alarm), lights, a display (such as a touchscreen display or LCD), a temperature sensor, a humidity sensor, a tilt sensor, networking components, batteries, switches, buttons, and connectors, among others.

The temperature and humidity sensors may be used to track temperature and humidity levels and alert or notify a user when a change in temperature or humidity occurs. A water detector 110 may include a tilt sensor to alert a user of a change in orientation of the water detector. For example, a water detector 110 may be placed underneath a sink and, during movement of other objects under the sink, may be knocked over or have an unexpected change in orientation. The tilt sensor can be used to identify that unexpected change in orientation and alert the user (e.g., via an audible alarm from the speaker or via the smartphone app or other networking components) to increase the likelihood of correct operation. The tilt sensor may include one or more gyroscopes or accelerometers. For example, an inertial measurement unit, or IMU, may be used that incorporates 3 gyroscopes, 3 accelerometers, and/or other sensors (e.g., pressure, magnetic, or proximity sensors).

The water detector 110 may include networking components 119 such that it can communicate with the satellite water detector 130, the water shut-off mechanism 200, the client component 180, or other objects. For example, the networking components may include wireless radio frequency receivers, transmitters, and/or transceivers, wireless networking (e.g., WiFi, Zigbee, Z-wave, mesh networks, Bluetooth, Bluetooth Low Energy), or other types of wired, wireless, digital, or analog communications components. Various forms of modulation (e.g., amplitude, frequency, phase shift, frequency shift, direct sequence, frequency hopping, etc.) and networking topologies (e.g., peer to peer, mesh, star, etc.) may be used as well.

The additional components 117 may include a battery. For example, in some embodiments using a housing 118 that is waterproof, a 3.6 V, 4,000 mAh battery may be used that is rated, under normal operating conditions, to be able to power the water detector 110 for approximately 10 years without needing replacement.

In some embodiments, the additional components 117 include a reed switch. A reed switch is a magnetic switch that is normally closed and that opens in the presence of a magnetic field of sufficient strength. This is useful for the purposes of the water detector 110 because it provides a convenient way to save battery life during shipping and storage and to power the device on when a user removes it from its box. For example, the water detector 110 with a reed switch may be placed in a package that contains a magnet at a location that corresponds to the location the water detector 110 will be placed during shipping and storage. Thus, while the water detector 110 is in its packaging for shipping and storage, the reed switch is open and the water detector 110 remains off to conserve battery life. Then, when the water detector 110 is removed from its packaging and the accompanying magnetic field, the reed switch returns to its normal closed position and the water detector 110 powers on.

In some embodiments, the water detector 110 may be configured to automatically pair or synchronize (e.g., via additional components 117 such as the networking components) to a water shut-off mechanism 200, a satellite water detector 130, other water detectors 110, or the client component 180, among others. For example, the water detector 110 may be removed from its packaging and, without any interaction on behalf of the user, begin to synchronize (e.g., via Bluetooth, wireless mesh, personal area, or other networks) to a software application such as a smartphone app.

In some embodiments, the water detector 110 may include additional components 117 such as additional connectors. For example, as discussed further in reference to FIGS. 2 and 3 herein, the water detector 110 may be connected to a satellite water detector 130. To maintain substantially waterproof housings for both the water detector 110 and the satellite water detector 130, magnetic connectors may be utilized.

FIG. 2 shows a bottom perspective view of the water detector of FIGS. 1A-1E and a bottom perspective view of a satellite water detector. The satellite water detector 130 may include apertures 132, a connector 134, a cable 136, and a housing 138. One or more water sensors, such as water sensor 116, may be located within apertures 132. The housing 138 may be a waterproof housing.

The satellite water detector 130 may include the same or similar components as the water detector 110. However, in some embodiments, the satellite water detector 130 may be a simpler version of the water detector 110 in order to keep costs lower while allowing a user to have more opportunities to detect the presence of unwanted water, especially where there are multiple areas of concern within close proximity of each other. For example, the satellite water detector 130 may include a water sensor 116 within one of the apertures 132, a housing 138, a cable 136, and a connector 134. The satellite water detector 130 may rely on the water detector 110 for power and communication, thus having no need of networking components or batteries.

FIG. 3 shows a top perspective view of the satellite water detector of FIG. 2. The satellite water detector 130 may include a catch basin 142 with an aperture 144 located at a lower portion of the catch basin 142 and a water sensor 116.

Similar to the catch basin 112 of water detector 110, the catch basin 142 is configured to funnel water (or liquid) to the water sensor 116 within aperture 144.

FIG. 4 shows a perspective and exploded view of a water shut-off mechanism in accordance with the present disclosure. The water shut-off mechanism 200 is designed to fit any standard quarter-turn ball valve and open or close it using an electric motor powered by a battery.

The water shut-off mechanism 200 includes a housing 210, position sensors 211, a chassis 212, pipe sleeves 214, pipe clamps 216, a motor 218, networking components 219, a battery 220, a sprocket 222, a transmission 224, a valve nut sleeve 226, a communication link 170, and a client component 180. FIG. 4 also shows a pipe 250, a shut-off valve 252, a shut-off valve handle 254, and a shut-off valve nut 256, which may be pre-existing components.

The water shut-off mechanism 200 is adapted to retrofit on existing pipes, such as a pipe 250. To install the water shut-off mechanism 200, various sizes of pipe sleeves 214 may be used in combination with pipe clamps 216. For example, typical sizes of pre-existing pipes may range from 0.5 inches to 2.5 inches, although others can be used as well. The chassis 212 slides into the pipe clamps 216. A valve nut sleeve 226 can be used to help align the transmission 224 with the shut-off valve 252. The transmission 224 couples to the shut-off valve handle 254 on one side and couples to the sprocket 222 on the other side. The sprocket 222 is connected to the motor 218, and the motor is powered by the battery 220. Networking components 219 may be the same or similar to the networking components 119 of the water detector 110.

In operation, the water shut-off mechanism 200 is communicatively coupled with the water detector 110. When water detector 110 detects the presence of water, it sends a signal (e.g., a wireless alert) to the water shut-off mechanism 200 via networking components 119, 219. In some embodiments, networking components 119, 219 include radio frequency transmitters, receivers, and/or transceivers. Upon receiving the signal, the water shut-off mechanism 200 turns the shut-off valve 252 to the closed position to shut off the water supply by operating the motor 218 to turn the sprocket 222, which turns the transmission 224, which is coupled to and turns the shut-off valve handle 254.

The water detector 100 may include position sensors 211. Position sensors 211 may include photoelectric, Hall effect, proximity, or other sensors. In some embodiments, position sensors 211 are installed on the housing 210 or the chassis 212 facing downwards. In other embodiments, the position sensors 211 may be installed on components other than the housing 210 or chassis 212 (e.g., Hall effect sensors may be installed on the transmission 224).

In some embodiments, the water shut-off mechanism 200 will initially open and close the shut-off valve 252 a number of times to record normal position and timing patterns (e.g., to determine the amount of time it normally takes to fully close the valve from the open position). This may be stored on memory on the water shut-off mechanism 200 (or elsewhere within the water detection system) or may be provided to the client component 180 via the communication link 170. Thus, if the water shut-off mechanism detects an abnormal position or timing in opening or closing the valve, an alert can be generated (e.g., at the client component 180 or an audible alert via the speaker). In some embodiments, the water shut-off mechanism may implement a pumping protocol, whereby the motor is rapidly engaged and disengaged in a pumping patter, similar to the action used by an impact drive to drive screws past sticking points.

FIG. 5A shows a perspective view and FIG. 5B shows a side view of a transmission of the water shut-off mechanism of FIG. 4. The transmission 224 includes protrusions 224a, a sprocket opening 223a, and an annular groove 227a. In some embodiments, such as the embodiment shown in FIG. 5B, the protrusions 224a are spaced apart to accommodate a variety of shut-off valve handles. Likewise, in some embodiments where the upward angle of the valve handle may interfere with proper placement of the transmission 224 (such as with smaller ball valves), the protrusions 224a flare downward to ensure the protrusions 224a can engage the shut-off valve handle 254 even if the transmission 224 cannot be completely lowered around the shut-off valve handle nut 256. The sprocket opening 223a is configured to correspond to the shape of the connecting end 223 of the sprocket 222. The annular groove 227a may connect to one or more detents 227 (or ball bearing or other component) on the sprocket 222 to provide tactile feedback that the sprocket 222 is properly seated within the transmission 224.

FIG. 6A shows a perspective view and FIG. 6B shows a cross-sectional view along line C-C of a sprocket of the water shut-off mechanism of FIG. 4 including a cut-out portion showing an example skirt interior. The sprocket 222 includes connecting ends 223, a skirt 225, detents 227, and a spring 229.

In some embodiments, the sprocket 222 is spring loaded, via spring(s) 229, such that the sprocket 222 will float in the housing 210 to allow for a vertical adjustment (e.g., up to 1.5 inches) in order to allow the water shut-off mechanism 200 to engage a variety of sizes of shut-off valves 252.

The skirt 225 may include one or more detents 227 (or ball bearings or other components) that lock into an annular groove 227a on the transmission 224. This allows for a user friendly installation by providing tactile feedback to indicate to the user that the sprocket 222 is properly seated inside the transmission 224.

FIG. 7 shows examples of the valve nut sleeve of FIG. 4. Valve nut sleeves 226 may be included with the water detection system that accommodate multiple nut sizes to ensure the water shut-off mechanism can retrofit to many differently sized shut-off valves 252. The valve nut sleeves 226 may help align the axis of the motor 218 with the axis of the shut-off valve 252. The valve nut sleeve 226 may slide around the shut-off valve nut 256 and may fit within the transmission 224. As shown in FIG. 7, the valve nut sleeves 226 may have a bottom portion with a smaller outside diameter than the top portion to avoid interference with shut-off valve handles 254 in smaller valves.

FIG. 8A shows a perspective view and FIG. 8B shows a side view of a self-centering chuck in accordance with the present disclosure. In some embodiments, in place of a valve nut sleeve 226, a self-centering chuck 826 may be used.

FIGS. 9A, 9B, and 9C show the self-centering chuck of FIG. 8A with the transmission of FIG. 4 and illustrate how the chuck and transmission can accommodate various ball valve nut sizes. FIGS. 9A, 9B, and 9C show a transmission 224, a self-centering chuck 826, and a shut-off valve nut 256. In operation, the self-centering chuck 826 is spring-loaded, configured to spin freely within the transmission 224, forms a snug fit around various shut-off valve nuts 256, and helps to align the axis of the shut-off valve 252 with that of the motor 218.

FIG. 10 illustrates a water shut-off mechanism, according to some embodiments. FIG. 10 shows a housing 210 coupled to a transmission 224 via sprocket. The transmission 224 has protrusions 224a that fit over a portion of the water shut-off valve handle 254.

FIG. 11 illustrates an exploded view of the components of a transmission, according to some embodiments. FIG. 11 shows a transmission 224 with four components: a housing 224b, a spring(s) 229, a chuck 826, and a skirt 224c with protrusions. The protrusions may be of differing dimensions, shapes, and/or sizes to enable the transmission to grip or fit on various sized water shut-off valve handles 254. In some embodiments, as illustrated in FIG. 11, the spring(s) 229 may be two co-axial springs that are cascaded inside housing 224b.

FIG. 12A shows a top view of the transmission of FIG. 11. FIG. 12B shows a cross-sectional view of the transmission of FIG. 11 fitting to a smaller shut-off valve nut. FIG. 12C shows a cross-sectional view of the transmission of FIG. 11 fitting to a larger shut-off valve nut. As shown in FIGS. 12A-12C, the transmission can fit to various water shut-off valve handles (e.g., via differing dimensions on the skirt 224c) and water shut-off valve nuts (e.g., via the spring(s) 229 and the chuck 826).

Those of skill in the art will appreciate that the herein described systems and methods may be subject to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

The invention claimed is:

1. A water detection system comprising:
a water detector comprising:
a catch basin with an aperture located at a lower portion of the catch basin;
a water sensor located within the aperture and adapted to detect the presence of water;
a wireless transmitter; and
a battery operatively coupled to the water sensor and the wireless transmitter; and
a water shut-off mechanism adapted to couple a water pipe with a shut-off valve comprising:
a chassis adapted to couple to the water pipe via at least one pipe sleeve and at least one pipe clamp;
a motor coupled to the chassis;
a battery electrically connected to the motor;
a sprocket coupled to the motor;
a transmission coupled to the sprocket and comprising two first protrusions, the first protrusions spaced apart and adapted to fit around a handle of the shut-off valve; and
a wireless receiver communicatively coupled to the water detector;
wherein the water detector sends, via the wireless transmitter, an alert when the water sensor detects the presence of water; and
wherein, in response to receiving the alert, the water shut-off mechanism turns the shut-off valve to a closed position; and
wherein the water detector further comprises a tilt sensor.

2. The water detection system of claim 1, wherein the tilt sensor is a gyroscope.

3. The water detection system of claim 1, wherein the tilt sensor is an inertial measurement unit.

4. The water detection system of claim 1, wherein the water detector comprises a substantially waterproof housing.

5. A water detection system comprising:
a water detector comprising:
a catch basin with an aperture located at a lower portion of the catch basin;
a water sensor located within the aperture and adapted to detect the presence of water;
a wireless transmitter; and
a battery operatively coupled to the water sensor and the wireless transmitter; and
a water shut-off mechanism adapted to couple a water pipe with a shut-off valve comprising:
a chassis adapted to couple to the water pipe via at least one pipe sleeve and at least one pipe clamp;
a motor coupled to the chassis;
a battery electrically connected to the motor;
a sprocket coupled to the motor;
a transmission coupled to the sprocket and comprising two first protrusions, the first protrusions spaced apart and adapted to fit around a handle of the shut-off valve; and
a wireless receiver communicatively coupled to the water detector;
wherein the water detector sends, via the wireless transmitter, an alert when the water sensor detects the presence of water; and
wherein, in response to receiving the alert, the water shut-off mechanism turns the shut-off valve to a closed position; and
wherein the water detector further comprises a housing with an external groove that corresponds to the shape of quarter-round trim; and
wherein the water detector further comprises a reed switch.

6. A water detection system comprising:
a water detector comprising:
a catch basin with an aperture located at a lower portion of the catch basin;
a water sensor located within the aperture and adapted to detect the presence of water;
a wireless transmitter; and
a battery operatively coupled to the water sensor and the wireless transmitter; and
a water shut-off mechanism adapted to couple a water pipe with a shut-off valve comprising:
a chassis adapted to couple to the water pipe via at least one pipe sleeve and at least one pipe clamp;
a motor coupled to the chassis;
a battery electrically connected to the motor;
a sprocket coupled to the motor;
a transmission coupled to the sprocket and comprising two first protrusions, the first protrusions spaced apart and adapted to fit around a handle of the shut-off valve; and
a wireless receiver communicatively coupled to the water detector;
wherein the water detector sends, via the wireless transmitter, an alert when the water sensor detects the presence of water; and
wherein, in response to receiving the alert, the water shut-off mechanism turns the shut-off valve to a closed position;
wherein the transmission further comprises an annular groove and wherein the sprocket further comprises a skirt with at least one ball bearing that is adapted to fit within the annular groove.

7. A water detection system comprising:
a water detector comprising:
a catch basin with an aperture located at a lower portion of the catch basin;
a water sensor located within the aperture and adapted to detect the presence of water;

a wireless transmitter; and a battery operatively coupled to the water sensor and the wireless transmitter; and a water shut-off mechanism adapted to couple a water pipe with a shut-off valve comprising:

a chassis adapted to couple to the water pipe via at least one pipe sleeve and at least one pipe clamp;

a motor coupled to the chassis;

a battery electrically connected to the motor;

a sprocket coupled to the motor;

a transmission coupled to the sprocket and comprising two first protrusions, the first protrusions spaced apart and adapted to fit around a handle of the shut-off valve;

a wireless receiver communicatively coupled to the water detector; and wherein the water detector sends, via the wireless transmitter, an alert when the water sensor detects the presence of water; and wherein, in response to receiving the alert, the water shut-off mechanism turns the shut-off valve to a closed position and wherein the transmission comprises two second protrusions, the second protrusions spaced apart and adapted to fit around the handle of the shut-off valve.

8. The water detection system of claim 7 wherein the first protrusions are spaced apart from each other at a first distance and the second protrusions are spaced apart a second distance, the first distance being different than the second distance.

9. The water detection of claim 7 wherein the transmission further includes a spring.

\* \* \* \* \*